(12) United States Patent
Caligiuri

(10) Patent No.: US 10,321,800 B2
(45) Date of Patent: Jun. 18, 2019

(54) CLEANING PAD FOR ELECTRONIC DEVICES

(71) Applicant: Cody Caligiuri, East Islip, NY (US)

(72) Inventor: Cody Caligiuri, East Islip, NY (US)

(*) Notice: Subject to any disclaimer, the term of this patent is extended or adjusted under 35 U.S.C. 154(b) by 317 days.

(21) Appl. No.: 15/201,928

(22) Filed: Jul. 5, 2016

(65) Prior Publication Data
US 2018/0009005 A1 Jan. 11, 2018

(51) Int. Cl.
*B08B 1/00* (2006.01)
*A47L 25/00* (2006.01)
*G02B 27/00* (2006.01)

(52) U.S. Cl.
CPC .............. *A47L 25/00* (2013.01); *B08B 1/00* (2013.01); *G02B 27/0006* (2013.01); *Y10T 428/14* (2015.01); *Y10T 428/28* (2015.01)

(58) Field of Classification Search
CPC .. B08B 1/006; B08B 3/04; B08B 1/00; A47L 25/00; G02B 27/0006; Y10T 428/14; Y10T 428/28
See application file for complete search history.

(56) References Cited

U.S. PATENT DOCUMENTS

| | | | | |
|---|---|---|---|---|
| 3,056,154 A | * | 10/1962 | Neal | A47L 13/18 15/104.002 |
| 5,046,608 A | * | 9/1991 | Laipply | A47K 10/16 206/209 |
| 5,922,427 A | * | 7/1999 | King | A47L 25/005 15/104.002 |
| 6,458,442 B1 | * | 10/2002 | McKay | A47L 23/266 15/104.93 |
| 8,931,115 B1 | | 1/2015 | Bonham | |
| 9,254,074 B2 | | 2/2016 | Metzger | |
| 2003/0024062 A1 | | 2/2003 | McKay | |
| 2007/0136973 A1 | | 6/2007 | Patel et al. | |
| 2012/0188743 A1 | * | 7/2012 | Wilson | G06F 3/041 361/816 |
| 2014/0345074 A1 | * | 11/2014 | Lee | A47L 25/00 15/210.1 |

* cited by examiner

*Primary Examiner* — Patricia L. Nordmeyer
(74) *Attorney, Agent, or Firm* — Carter, Deluca & Farrell, LLP.

(57) ABSTRACT

A cleaning pad for electronic devices includes a first layer and a second layer. The first layer has a top surface and a bottom surface. The second layer has a top surface and a bottom surface removably attached to the top surface of the first layer. The bottom surface of the second layer includes an interior portion fabricated from a cleaning material for cleaning a display of an electronic device, and an exterior portion surrounding the interior portion and fabricated from an adhesive material. The interior portion of the bottom surface of the second layer is sealed between the exterior portion of the bottom surface of the second layer and the top surface of the first layer.

17 Claims, 4 Drawing Sheets

CLEANING PAD FOR ELECTRONIC DEVICES

BACKGROUND

Technical Field

The present disclosure relates generally to wipes for cleaning surfaces of electronic devices. More particularly, the present disclosure relates to layered cleaning pads for cleaning electronic devices and/or methods of using the disclosed cleaning pads.

Background of Related Art

Most people rarely leave home without bringing at least one of their mobile devices, for example, a mobile phone, a tablet, a smartwatch, or other similar electronic device. These mobile devices have a user interface or display that typically requires the user to use his or her fingers to operate the device. As can be appreciated, the constant touching of the screen or display will inevitably result in the screen becoming unclean from natural oils emitted from the skin of a user's hand, food particles, and other sources of bacteria that may make the screen unclear, unsightly, or even render the screen a fostering ground for bacterial growth.

Typically, to clean the display/optics or other parts of the mobile device, one will use a tissue, a piece of clothing, or any other form of wipe they have access to. However, oftentimes one may not have anything on hand that is effective at cleaning and/or disinfecting surfaces of their mobile device, especially if the person is outside of their home.

Accordingly, a need exists for a portable, disposable wipe that attaches to a mobile device and that remains sterile until ready for use.

SUMMARY

In one aspect of the present disclosure, a cleaning pad for electronic devices is provided. The cleaning pad includes a first layer and a second layer. The first layer has a top surface and a bottom surface. The second layer has a top surface and a bottom surface removably attached to the top surface of the first layer. The bottom surface of the second layer includes an interior portion fabricated from a cleaning material for cleaning a display of an electronic device, and an exterior portion surrounding the interior portion and fabricated from an adhesive material. The interior portion of the bottom surface of the second layer is sealed between the exterior portion of the bottom surface of the second layer and the top surface of the first layer.

In some embodiments, the bottom surface of the first layer may include an interior portion and an exterior portion that surrounds the interior portion of the first layer. The interior portion of the first layer may be fabricated from a cleaning material for cleaning a display of an electronic device. The exterior portion of the first layer may be fabricated from an adhesive material.

It is contemplated that the bottom surface of the first layer may have an adhesive material for adhering to a mobile device.

It is envisioned that the cleaning material may be configured to expand outwardly from a compressed state to an expanded state upon the second layer being removed from the first layer. The cleaning material may protrude outwardly relative to the adhesive material in the expanded state and be flush with the adhesive material in the compressed state.

In some aspects, the cleaning material may be cloth, paper, and/or sponge material.

In some embodiments, the cleaning material may be a microfiber and the adhesive material may be a pressure-sensitive adhesive.

It is contemplated that the cleaning pad may be sized and dimensioned to be applied to a surface of a mobile phone.

It is envisioned that the exterior portion of the bottom surface of the second layer may have a corner portion devoid of the adhesive material.

In some aspects, the seal formed between the exterior portion of the bottom surface of the second layer and the top surface of the first layer may be hermetic.

In some embodiments, the top surface of the first layer may have an interior portion and an exterior portion that surrounds the interior portion of the top surface of the first layer. The interior portion of the top surface of the first layer may be recessed relative to the exterior portion of the top surface of the first layer such that the cleaning material of the second layer is received within the interior portion of the top surface of the first layer. The cleaning material of the second layer may protrude relative to the adhesive material of the second layer.

In another aspect of the present disclosure, a method of cleaning a display of a mobile device is provided. The method includes adhering the cleaning pad to a mobile device such that the bottom surface of the first layer of the cleaning pad is adhered to the mobile device, peeling the second layer of the cleaning pad away from the first layer of the cleaning pad, and wiping a display of the mobile device with the cleaning material of the second layer of the cleaning pad.

In some embodiments, the method may further include discarding the second layer, peeling the first layer away from the mobile device, and wiping the display of the mobile device with the cleaning material of the first layer of the cleaning pad.

Further details, advantages, and aspects of exemplary embodiments of the present disclosure are described in more detail below with reference to the appended figures.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

Embodiments of the present disclosure are described herein with reference to the accompanying drawings, wherein.

DETAILED DESCRIPTION

Figure 1:
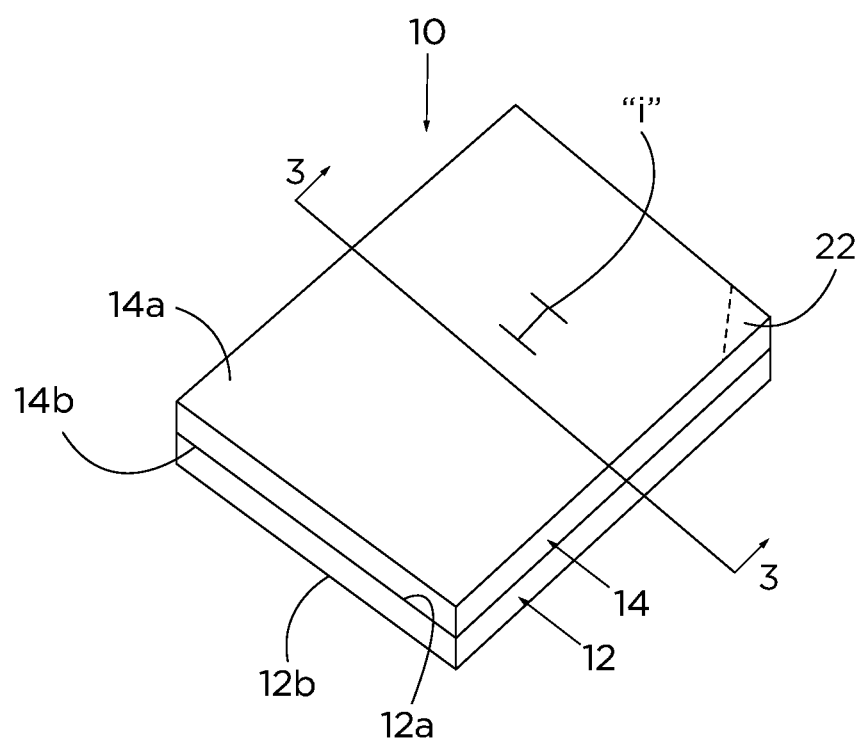
FIG. 1 is a perspective view of an embodiment of a cleaning pad for an electronic device in accordance with the principles of the present disclosure.

Embodiments of the presently disclosed cleaning pads and methods of use are described in detail with reference to the drawings, in which like reference numerals designate identical or corresponding elements in each of the several views.

Figure 2A:
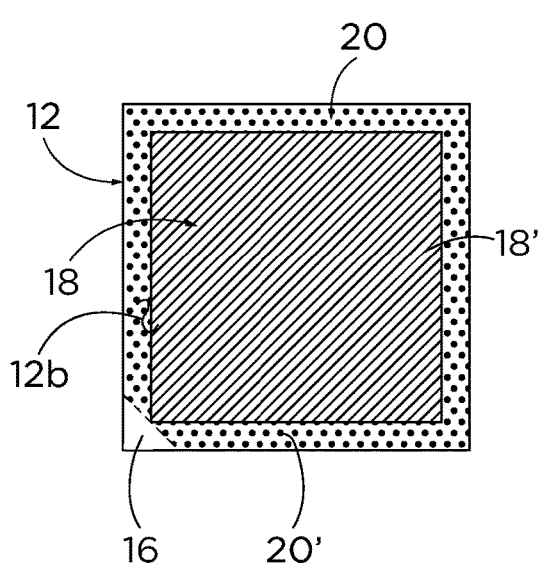
FIG. 2A is a plan view of a bottom surface of a layer of the cleaning pad of FIG. 1.
Figure 2B:
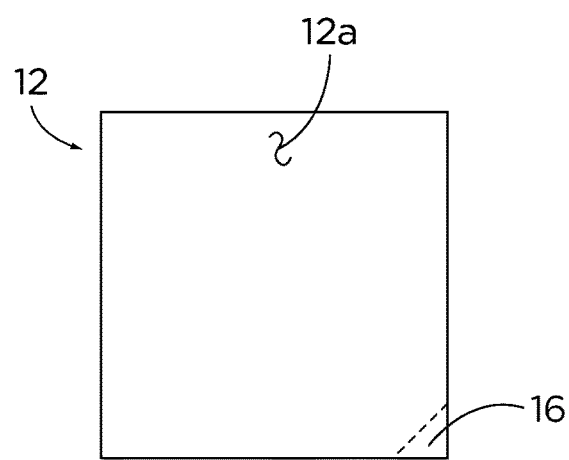
FIG. 2B is a plan view of a top surface of the layer of the cleaning pad of FIG. 2A.
Figure 3:
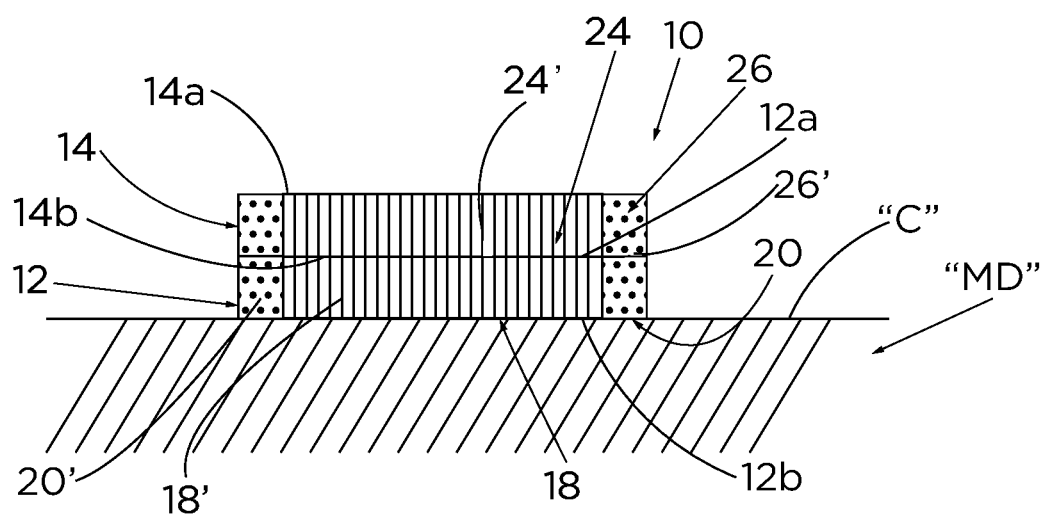
FIG. 3 is a cross-section, taken along line 3-3 in FIG. 1, illustrating first and second layers of the cleaning pad.

Referring initially to FIGS. 1-3, illustrated is a cleaning apparatus in the form of a pad configured to be removably adhered to a mobile device is generally designated by reference numeral 10. In some embodiments, the cleaning pad 10 may be sized and dimensioned to be applied to a variety of electronic devices, such as, for example, tablets, smartwatches, camera lenses, LCD screens, mobile phones, laptops, or any other device having a display/optics to be cleaned by the cleaning pad 10. The cleaning pad 10 may have a length of between about 10 mm and about 150 mm, a width of between about 10 mm and about 150 mm, and a thickness of between about 0.5 mm and about 10 mm. In some embodiments, the cleaning pad 10 may have a length of between about 20 mm and about 60 mm, a width of between about 20 mm and about 60 mm, and a thickness of between about 1 mm and about 3 mm.

The cleaning pad 10 generally includes a plurality of layers of disposable cleaning wipes that are stacked on top of one another and which adhere to a surface of an electronic device, for example, a cover of a mobile device, as will be described in detail herein. In particular, the cleaning pad 10 includes a first layer or wipe 12 and a second layer or wipe 14 disposed on top of the first layer 12. In some embodiments, the cleaning pad 10 may include more than two layers, for example, three or more layers that are stacked on top of one another. The first and second layers 12, 14 have a generally square configuration. It is contemplated that the first and second layers 12, 14, may have any suitable configuration, for example, rectangular, triangular, rounded, star-shaped, or the like. The layers 12, 14 are flexible, but it is contemplated that the layers 12, 14 may be of a rigid construction.

The first layer 12 of the cleaning pad 10 has a top surface 12a and a bottom surface 12b, opposite the top surface 12a. The top surface 12a is configured to display indicia "i," for example, a logo, phrase, or image. The indicia "i" may be imprinted onto the top surface 12a of the first layer 12 using any suitable process, for example, silk-screening. The first layer 12 may have a tab 16 formed at a corner portion thereof configured to be grasped between fingers such that the first layer 12 may be peeled away from a surface of a mobile device via the tab 16.

The bottom surface 12b of the first layer 12 of the cleaning pad 10 includes an interior portion 18 and an exterior portion 20 that surrounds the interior portion 18, for example, surrounds a perimeter of the interior portion 18. The interior portion 18 may be entirely surrounded by the exterior portion 20. In some embodiments, the exterior portion 18 only partially surrounds the interior portion 20. The exterior portion 20 makes up between about 1% and about 10% of the surface area of the bottom surface 12b and has a thickness of about 0.1 mm to about 5 mm. The interior portion 18 of the bottom surface 12b is fabricated from a cleaning material 18', such as, for example, microfiber cloth, for cleaning a display screen of an electronic device, for example, a screen of a mobile phone. In some embodiments, the cleaning material 18' may be any material suitable for cleaning display screens or other optics, for example, various cloths, paper-containing wipes, sponge material, or the like. It is contemplated that the cleaning material 18' may be pre-moistened with a cleaning solution, for example, isopropyl alcohol.

The exterior portion 20 of the bottom surface 12a of the first layer 12 is fabricated from an adhesive material 20', such as, for example, a pressure-sensitive adhesive, for removably attaching the first layer 12 of the cleaning pad 10 to a surface of an electronic device (e.g., a cover of a mobile phone) or another layer (not shown) of the cleaning pad 10. The adhesive material 20' may be a polyurethane adhesive, removable tape, a peelable adhesive gel, or any other suitable peelable adhesive. In some embodiments, only a portion of the exterior portion 20 is fabricated from an adhesive material 20' instead of an entirety of the exterior portion 20 being fabricated from adhesive material 20'

The second layer 14 of the cleaning pad 10 has a top surface 14a and a bottom surface 14b removably attached to the top surface 12a of the first layer 12. The top surface 14a of the second layer 14 is configured to display indicia, for example, a logo, phrase, or image. In some embodiments, the top surface 14a of the second layer 14 may have another layer or layers, similar to the first and second layers 12, 14, removably attached thereto. The top surface 14a of the second layer 14 may have a tab 22 formed at a corner portion thereof configured to be grasped between fingers such that the second layer 14 may be peeled away from the first layer 12 via the tab 22.

The bottom surface 14b of the second layer 14 includes an interior portion 24 and an exterior portion 26 that surrounds the interior portion 24. The interior portion 24 may be entirely surrounded by the exterior portion 26. In some embodiments, the exterior portion 26 only partially surrounds the interior portion 24. The exterior portion 26 makes up between about 1% and about 10% of the surface area of the bottom surface 14b and has a thickness of about 0.1 mm to about 5 mm. The interior portion 24 of the bottom surface 14b is fabricated from a cleaning material 24', such as, for example, any of the cleaning materials disclosed above.

The exterior portion 26 of the bottom surface 14b of the second layer 14 is fabricated from an adhesive material 26', such as, for example, any of the adhesive materials disclosed above, such that the second layer 14 is removably attached to the top surface 12a of the first layer 12 of the cleaning pad 10. In some embodiments, only a portion of the exterior portion 26 of the second layer 14 is fabricated from the adhesive material 26' instead of an entirety of the exterior portion 26 being adhesive. The exterior portion 26 may have a corner portion or tab 22 devoid of any adhesive material 26' such that the second layer 14 is peelable away from the first layer 12 by grasping and pulling at the corner portion 22.

The adhesive material 26' of the second layer 14 allows the bottom surface 14b of the second layer 14 to removably attach to the top surface 12a of the first layer 12 and to form a seal therebetween. The seal between the exterior portion 26 of the bottom surface 14b of the second layer 14 and the top surface 12a of the first layer 12 forms a sealing chamber therein in which the cleaning material 24' of the second layer 14 is concealed. The sealing chamber keeps the cleaning material 24' clean and/or sterile until ready for use. In some embodiments, the seal between the exterior portion 26 of the bottom surface 14b of the second layer 14 and the top surface 12a of the first layer 12 may be hermetic to prevent air from passing into and/or out of the sealing chamber.

When the second layer 14 of the cleaning pad 10 is attached to the first layer 12 of the cleaning pad 10, the cleaning material 24' of the second layer 14 is in a compressed state in which the cleaning material 24' of the second layer 14 is flush with the adhesive material 26' of the second layer 14. In some embodiments, when the second layer 14 is attached to the first layer 12, the cleaning material 24' of the second layer 14 may be recessed relative to the adhesive material 26'. The cleaning material 24' is configured to expand outwardly from the compressed state to an expanded state upon the second layer 14 being removed from the first layer 12. In the expanded state, the cleaning material 24' of the second layer 14 protrudes outwardly (i.e., downwardly away from the bottom surface 14b) relative to the adhesive material 26' of the second layer 14. As such, when the second layer 14 is used as a cleaning wipe, the cleaning material 24' of the second layer 14 and not the adhesive material 26' of the second layer 26' makes wiping contact with the surface to be cleaned. In some embodiments, the adhesive material 26' of the second layer 14 may be configured to peel away from the second layer 14 so that only the cleaning material 24' of the second layer 14 remains during use thereof.

The first and second layers 12, 14, may each have an intermediate layer or film (not explicitly shown) of malleable material, for example, polyethylene terephthalate, on which the cleaning material 18' and 24' and the adhesive material 20' and 26' are disposed. During manufacturing, the film acts as a substrate on which the top and bottom surfaces 12a, 14a and 12b, 14b of each of the first and second layers 12, 14, may be overlaid. The film may also be impermeable so as to maintain the hermetic seal between the first and second layers 12, 14. The adhesive material 20' has a stronger adhesion to the film than to a surface of a mobile device such that the first layer 12 can be peeled off of a surface of a mobile device while keeping the adhesive material 20' on the film of the first layer 12 rather than the surface of the mobile device.

In use, the cleaning pad 10 may be attached to a surface, such as, for example, a cover "C" of a mobile device "MD." Prior to attaching the cleaning pad 10 to the mobile device "MD," a protective layer (not explicitly shown) of the cleaning pad 10 may be detached from the bottom surface 12b of the first layer 12 of the cleaning pad 10 to expose the adhesive material 20' of the bottom surface 12b of the first layer 12. The cleaning pad 10 may be applied to the cover "C" of the mobile device "MD," whereby the adherent, exterior portion 20 of the bottom surface 12b of the first layer 12 sticks to the cover "C." Due to the overall small size of the cleaning pad 10, the cleaning pad 10 does not hinder regular usage of the mobile device "MD."

When the display or any other portion of the mobile device "MD" accumulates dirt, the cleaning pad 10 may be used to clean and/or disinfect the mobile device "MD." In particular, the tab 22 of the second layer 14 may be grasped by a user and pulled back to overcome the binding force of the adhesive material 26' of the bottom surface 14b of the second layer 14. As the second layer 14 is peeled away from the first layer 12, the seal between the exterior portion 26 of the bottom surface 14b of the second layer 14 and the top surface 12a of the first layer 12 is broken to expose the cleaning material 24' of the second layer 14. Upon the complete separation of the second layer 14 from the first layer 12 of the cleaning pad 10, the second layer 14 may be used as a cleaning wipe to clean the display of the mobile device "MD" or any other surface of the mobile device "MD." After using the second layer 14, the second layer 14 may be discarded or re-adhered to the first layer 12 for additional usage at a later time.

When the mobile device "MD" accumulates more dirt, the first layer 12 of the cleaning pad 10 may be peeled away from the mobile device "MD" and the cleaning material 18' thereof may be used to clean the mobile device "MD" in a similar manner as the second layer 14 described above.

Figure 4:
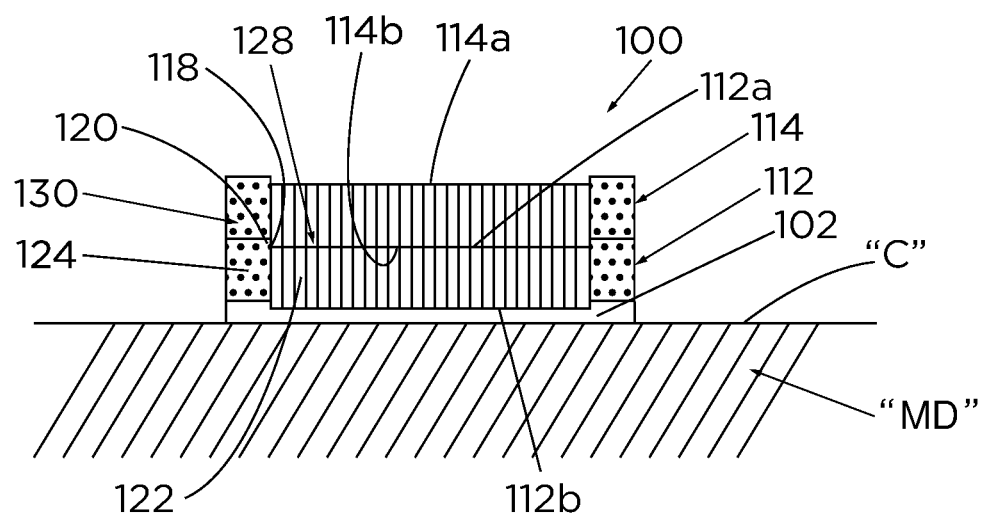
FIG. 4 is a cross-sectional view of another embodiment of a cleaning pad for electronic devices in accordance with the principles of the present disclosure.

With reference to FIG. 4, another embodiment of a cleaning pad 100, similar to cleaning pad 10 described above, is provided. Due to the similarity of the cleaning pad 100 to the cleaning pad 10 already described above with reference to FIGS. 1-3, the cleaning pad 100 will only be described with a degree of detail necessary to elucidate the differences.

The cleaning pad 100 includes a base layer 102, a first layer or wipe 112 disposed on the base layer 102, and a second layer or wipe 114 disposed on top of the first layer 112. The base layer 102 is configured to removably adhere to a surface or cover "C" of a mobile device "MD." In some embodiments, the cleaning pad 100 may not include the base layer 102, and instead the first layer 112 may adhere directly to the cover "C" of the mobile device "MD." The first layer 112 of the cleaning pad 100 has a top surface 112a and a bottom surface 112b, opposite the top surface 112a. The top surface 112a is configured to display indicia, for example, a logo, phrase, or image. The top surface 112a of the first layer 112 has an interior portion 118 and an exterior portion 120 that surrounds the interior portion 118. The interior portion 118 of the top surface 112a of the first layer 112 is recessed relative to the exterior portion 120 such that cleaning material of the second layer 114 may be received within the interior portion 118 of the top surface 112a of the first layer 112, as will be described in detail below.

The bottom surface 112b of the first layer 112 includes an interior portion 122 and an exterior portion 124 that surrounds the interior portion 122. The interior portion 122 of the bottom surface 112b is fabricated from a cleaning material for cleaning a display screen of an electronic device, for example, a screen of a mobile phone. The exterior portion 124 of the bottom surface 112b of the first layer 112 is fabricated from an adhesive material for removably attaching the first layer 112 of the cleaning pad 100 to the base layer 102, a surface of an electronic device (e.g., cover "C" of mobile device "MD"), or another layer of the cleaning pad 100.

The second layer 114 of the cleaning pad 100 is similar to the first layer 112. In particular, the second layer 114 of the cleaning pad 100 has a top surface 114a and a bottom surface 114b removably attached to the top surface 112a of the first layer 112. The top surface 114a is configured to display indicia, for example, a logo, phrase, or image. In some embodiments, the top surface 114a of the second layer 114 may have another layer or layers, similar to the first and second layers 112, 114, removably attached thereto. In some embodiments, the top surface 114a of the second layer 114 may be recessed similar to the top surface 112a of the first layer 112 or may be flush throughout similar to the first and second layers 12, 14 of the cleaning pad 10 described with reference to FIGS. 1-3.

The bottom surface 114b of the second layer 114 includes an interior portion 128 and an exterior portion 130 that surrounds the interior portion 128. The interior portion 128 of the bottom surface 114b is fabricated from a cleaning material, such as, for example, any of the cleaning materials disclosed above. The exterior portion 130 of the bottom surface 114b of the second layer 114 is fabricated from an adhesive material, such as, for example, any of the adhesive materials disclosed above, such that the second layer 114 is removably attached to the top surface 112a of the first layer 112 of the cleaning pad 100.

The adhesive material of the second layer 114 allows the bottom surface 114b of the second layer 114 to removably attach to the top surface 112a of the first layer 112 and to form a seal therebetween. The seal between the exterior portion 130 of the bottom surface 114b of the second layer 114 and the top surface 112a of the first layer 112 forms a sealing chamber therein in which the cleaning material of the second layer 114 is retained or concealed. The sealing chamber keeps the cleaning material clean and/or sterile until ready for use. In some embodiments, the seal between the exterior portion 130 of the bottom surface 114b of the second layer 114 and the top surface 112a of the first layer 112 may be hermetic to prevent air from passing into and/or out of the sealing chamber.

The cleaning material of the interior portion 128 of the second layer 114 protrudes outwardly (i.e., extends downwardly) relative to the adhesive material of the exterior portion 130 of the second layer 114 to be received within the recessed interior portion 118 of the top surface 112a of the first layer 112. As such, during use of the second layer 114 as a cleaning wipe, only the cleaning material of the second layer 114 and not the adhesive material of the second layer 114 makes wiping contact with the surface to be cleaned.

The first and second layers 112, 114 may each have an intermediate layer or film (not explicitly shown) of malleable material, for example, polyethylene terephthalate, on which the cleaning material and adhesive material are disposed. During manufacturing, the film acts as a substrate on which the top and bottom surfaces 112a, 114a and 112b, 114b of each of the first and second layers 112, 114 may be overlaid.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:
1. A cleaning pad for electronic devices, comprising:
a first layer having a top surface and a bottom surface, wherein the bottom surface of the first layer includes:
an interior portion fabricated from a cleaning material for cleaning a display of an electronic device; and
an exterior portion surrounding the interior portion of the first layer and fabricated from an adhesive material;
a second layer having a top surface and a bottom surface removably attached to the top surface of the first layer, such that the bottom surface of the second layer is completely separable from the top surface of the first layer, the bottom surface of the second layer including:
an interior portion fabricated from a cleaning material for cleaning a display of an electronic device; and
an exterior portion surrounding the interior portion of the second layer and fabricated from an adhesive material, wherein the interior portion of the bottom surface of the second layer is sealed between the exterior portion of the bottom surface of the second layer and the top surface of the first layer.

2. The cleaning pad of claim 1, wherein the adhesive material of the bottom surface of the first layer is polyurethane adhesive, removable tape, or a peelable adhesive gel.

3. The cleaning pad of claim 1, wherein the cleaning material of the second layer is configured to expand outwardly from a compressed state to an expanded state upon the second layer being removed from the first layer.

4. The cleaning pad of claim 3, wherein the cleaning material of the second layer protrudes outwardly relative to the adhesive material of the second layer in the expanded state and is flush with the adhesive material of the second layer in the compressed state.

5. The cleaning pad of claim 1, wherein the cleaning material is selected from the group consisting of cloth, paper, and sponge material.

6. The cleaning pad of claim 1, wherein the cleaning material is a microfiber.

7. The cleaning pad of claim 1, wherein the adhesive material is a pressure-sensitive adhesive.

8. The cleaning pad of claim 1, wherein the cleaning pad is sized and dimensioned to be applied to a surface of a mobile phone.

9. The cleaning pad of claim 1, wherein the exterior portion of the bottom surface of the second layer has a corner portion devoid of the adhesive material.

10. The cleaning pad of claim 1, wherein the seal formed between the exterior portion of the bottom surface of the second layer and the top surface of the first layer is hermetic.

11. The cleaning pad of claim 1, wherein the top surface of the first layer has an interior portion and an exterior portion that surrounds the interior portion of the top surface of the first layer, the interior portion of the top surface of the first layer being recessed relative to the exterior portion of the top surface of the first layer such that the cleaning material of the second layer is received within the interior portion of the top surface of the first layer, wherein upon detaching the second layer from the first layer, the cleaning material of the second layer protrudes from the adhesive material of the second layer.

12. The cleaning pad of claim 1, wherein the cleaning material of the second layer protrudes from the adhesive material of the second layer.

13. The cleaning pad according to claim 12, wherein the cleaning material of the second layer is received in a recess defined in the top surface of the first layer.

14. The cleaning pad according to claim 13, wherein the top surface of the cleaning material of the first layer is recessed relative to the top surface of the adhesive material of the first layer.

15. The cleaning pad according to claim 12, further comprising a base layer configured to removably adhere to a surface of a mobile phone, wherein the first layer is disposed on the base layer.

16. The cleaning pad according to claim 1, wherein the cleaning pad has a length of between about 10 mm and about 150 mm, a width of between about 10 mm and about 150 mm, and a thickness of between about 0.5 mm and about 10 mm.

17. The cleaning pad according to claim 16, wherein the cleaning pad has a length of between about 20 mm and about 60 mm, a width of between about 20 mm and about 60 mm, and a thickness of between about 1 mm and about 3 mm.

* * * * *